United States Patent
Casabona et al.

(10) Patent No.: US 7,036,121 B1
(45) Date of Patent: Apr. 25, 2006

(54) METHOD AND SYSTEM FOR MAINTAINING SOFTWARE VIA NETWORK

(75) Inventors: Michel Casabona, Le Cres (FR); Rainer Hapatzky, Fellbach (DE); Hilar Hittinger, Eningen (DE); Gerhard Widmayer, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 09/696,399

(22) Filed: Oct. 25, 2000

(30) Foreign Application Priority Data

Dec. 1, 1999 (DE) .................... 991 23 831

(51) Int. Cl.
 *G06F 9/44* (2006.01)
(52) U.S. Cl. .................................... 717/173
(58) Field of Classification Search ........ 717/168–178; 345/748–749; 709/217–232; 707/104.1, 707/10, 200–201; 713/1
See application file for complete search history.

(56) References Cited

U.S. PATENT DOCUMENTS

| | | | | |
|---|---|---|---|---|
| 5,689,640 A * | 11/1997 | Okanoue | ................ | 709/221 |
| 5,845,077 A * | 12/1998 | Fawcett | ................ | 709/221 |
| 5,848,421 A * | 12/1998 | Brichta et al. | ............... | 707/200 |
| 6,141,010 A * | 10/2000 | Hoyle | ......................... | 345/854 |
| 6,151,643 A * | 11/2000 | Cheng et al. | ................. | 710/36 |
| 6,202,070 B1 * | 3/2001 | Nguyen et al. | .......... | 707/104.1 |
| 6,292,889 B1 * | 9/2001 | Fitzgerald et al. | ............. | 713/1 |
| 6,360,366 B1 * | 3/2002 | Heath et al. | ................. | 717/178 |
| 6,405,219 B1 * | 6/2002 | Saether et al. | ............. | 707/201 |
| 6,487,723 B1 * | 11/2002 | MacInnis | ..................... | 725/132 |
| 6,493,871 B1 * | 12/2002 | McGuire et al. | ............ | 717/173 |
| 2003/0004952 A1 * | 1/2003 | Nixon et al. | .................. | 707/10 |

* cited by examiner

*Primary Examiner*—Kakali Chaki
*Assistant Examiner*—Tuan Anh Vu
(74) *Attorney, Agent, or Firm*—Duke W. Yee; John R. Pivnichny; Wayne P. Bailey (57) ABSTRACT

The present invention relates to a method and system for maintaining software products installed on client systems via network. It can advantageously be provided a hierarchy of overlay repositories, for example 'country level' and 'system level'. Country level repositories may contain national language support, code page definitions and other common customizations and add-ons specific for the plurality of clients of a whole country.

A dedicated command is issued to a system or to a group of systems. Said command goes through the repository hierarchy—from local to top-level or reversed, local data overwrites central data—and creates a list of files. That list contains per file the location in the repository where it will be taken from during the later download.

16 Claims, 8 Drawing Sheets

SELECTIVE MULTI-LEVEL PULL-PROCESS

INVENTIONAL

METHOD AND SYSTEM FOR MAINTAINING SOFTWARE VIA NETWORK

BACKGROUND OF THE INVENTION

The present invention relates to a method and system for maintaining software products which are implemented in a plurality of client computer systems located decentralized relative to a centralized software maintenance institution via a network connecting them.

DESCRIPTION AND DISADVANTAGES OF PRIOR ART

For the purpose of clearly defining the subject matter of the present invention the term 'software maintenance' is intended to include any tasks in conjunction with holding a user application software or a system software in a status which is adequate and in line with the actual requirements set up by the enterprise or a private person which uses said software for achieving its (business) goals. Said maintenance thus comprises to install new software products on a client system, update from an old version to a new version of the same software product, perform customization tasks at the client system and integrate any client-specific supplemental programs like user exits which are logically connected with the software product to be maintained in the client system.

In prior art there are many different methods of the above mentioned software maintenance method. A particular aspect which sets the focus on a particular subset of said plurality of methods is that the method and system according to the present invention is only concerned with solutions which can be provided via a network connecting the plurality of client systems with a server system related to the vendor of the exemplary software product in question which is to be maintained.

In general, it is a difficult task to perform an update of an existing software product on a client system when the software product includes programs which generate a plurality of processes in the computer system, or, when the processes have a large plurality of customer-specific logical or physical interfaces which must be reconfigured each time when an update of the product shall be performed.

Furthermore, the work which is necessary to perfectly adjust a new version of the software product to the user at the client system increases when the so called customization of the product is difficult, or, when important program modifications as are for example user exits which had been manually programmed by the client staff and had been integrated in the software product's old version have to be reconfigured and reintegrated on an update from the old version to the new version of a particular software product.

Thus, a general task of any software installation method or software maintenance method is to provide said maintenance work with a minimum effort. It should be noted that both—the client and the software vendor usually participate in this work.

When a software vendor has a large plurality of clients which use the vendor's software the obligation to help the client to succeed in properly installing a new version of the software product and to succeed in the client's customizing processes is a considerable burden for the software vendor. Generally, the vendor has to provide stuff like system programmers who now about the software product being sold and have particular knowledge about the client specific customization and modification processes required. This obligation increases the more complex is the software product and the more dependent is the client for achieving a non-disturbed workflow with the software product in his enterprise.

U.S. Pat. No. 5,421,009 discloses a method for remote installation of software over a computer network which allows a user to interactively select each remote computer system as a target for software installation or to provide a file containing a list of all target remote computer systems. The remote system is first checked for being available to be accessed via the network, then some standard operation system specific checks are performed, the hardware resources, in particular disc space is checked, and when all prerequisites are satisfied, then all files that are being remotely installed are combined into a single data stream which is sent over the network to the remote computer system where the data stream is separated again into the original files. After storage of the files, the new program version has however to be adapted to the client-specific environment which includes the above mentioned work to be done by system programmers. When this work is completed the new program version can be run at least for testing purposes.

Figure 1A:
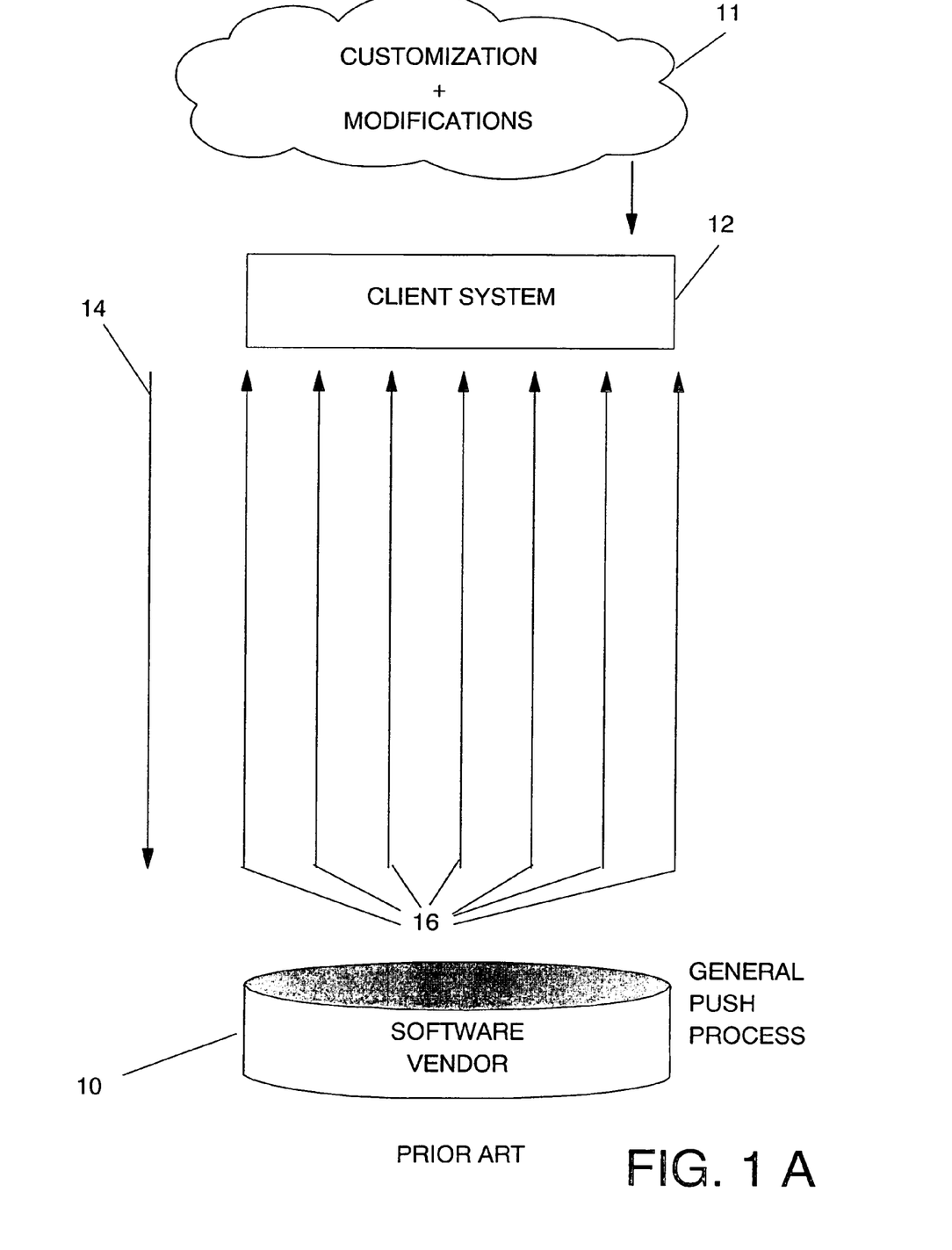
FIG. 1A, B is a schematic representation illustrating and comparing the inventional software maintenance method with prior art.

A rough schema of that kind of prior art software maintenance can be seen from FIG. 1A. The data base 10 of a software vendor is depicted in which a plurality of software products is stored. When an end-user of a client system 12 wants to install a new version of a software product X which already exists in an older version on the client system the client system requests a download of the files corresponding during said upgrade process.

Said step of requesting is depicted with a single arrow 14. Then, the download is performed which is depicted with a plurality of arrows 16 and the new version is installed on the client system. The plurality of arrows illustrates the network traffic required for doing this. When delta information is transferred instead of the complete files the new product version is comprised of the network traffic will be reduced to some degree.

The installing method described there reduces the amount of work necessary for system programmers because software can be installed without first installing a download program on the client computer system and because a user is allowed to either interactively select each client computer system for the intended software installation or to provide a batch-file which contains a list of all target computer systems.

This method, however, does not alleviate the above mentioned large amount of system programmer's work 11 except, that the work could be done centrally in the product vendor's environment and could be sent selectively to the target systems. This approach, however, would lead to much network traffic necessary for the 'push' process by which the customized software could be transferred to the large number of client systems.

OBJECTS OF THE INVENTION

It is thus an object of the present invention to reduce the amount of work to be provided in order to maintain software products in a plurality of client locations in a network without increased network traffic.

SUMMARY AND ADVANTAGES OF THE INVENTION

This object of the invention is achieved by the features stated in enclosed independent claims. Further advantageous arrangements and embodiments of the invention are set forth in the respective subclaims.

Summarizing the basic concepts comprised of the present invention software products are installed and are maintainable in software repositories provided via network on target systems.

This approach resembles a variety of warehouses in which the software products are offered as available goods.

The inventional method and system for software maintenance can be performed in a single command-oriented process. This centralizes and automates the work that is normally done locally for software maintenance. In that aspect the installation of fixes, testing and some customization is moved to central organizations, i.e., the repository providers.

Local customizations, bug fixes and modifications are placed into so-called local overlay repositories, to be described down below.

Viewed from a target system the software load activities, the cutover into production activities, possible fall back activities for running again the old program version in case of production problems, product removal activities and other activities are reduced to single commands. Such commands can be sent to a single system or to a collection of systems. According to the basic concepts of the present invention a collection of software products is offered in a central repository. This can be provided by a central organisation within a big company or by an external provider. Depending of the nature of the software offered and the clients to be served such central repositories may contain software products that fit together, that are on a very high fix level and that are tested together. Each update of a product to be offered should be put into an own complete product deliverable from the repository. Old levels may be offered in parallel to serve customers that cannot use the latest fixes. Aliasing techniques can be used to avoid that identical data is kept several times within the repository. Thus, the directory structure which organizes the products within the repository should advantageously identify the product and the delivery level, i.e., its version number.

With this aliasing aspect a version specific selection of files, or data, respectively, can be provided physically in the plurality of repositories.

Additionally, when a software product is provided in two different versions, as e.g., 2.0 and 2.1, very often it comprises a subset of files which remain to be identical although the product versions are different. Those identical data can advantageously continued to be used by the client when they exist already on the client system. According to the present invention this is achieved by a compare of existing files between a client system and list which has been established by walking through the repository hierarchy.

Further, in order to minimize network load and the effect of technical outages central repositories or parts of them can be advantageously copied to decentralized locations called shadow repositories. Products that are stored in shadow repositories have to be the same as in the central repository. Further, customizations, local fixes and modifications associated with a software product are advantageously placed into so-called overlay repositories. It can advantageously be provided a hierarchy of overlay repositories, for example 'country level' and 'system level'. Country level repositories may contain national language support, code page definitions and other common customizations and add-ons specific for the plurality of clients of a whole country and contain thus some specific delta information relative to the centralized repository expressing e.g. Language or country specific data.

System level repositories may contain local configurations and customizations specific for a target system or a group of them.

In case data from central repositories should be excluded from being moved to target systems, exclusion lists specifying said data can be prepared and placed somewhere in the repository hierarchy, e.g., onto overlay repositories.

Utilizing the above described system structure a product installation process as a part of the software maintenance work could proceed according to the present invention as follows:

First, a preparing step must be performed in order to 'fill' the repositories with the appropriate data. This can be achieved with an inventional tool which creates the hierarchical overlay directories and helps to select the files that contain configuration and customization data and helps to put the files onto the hierarchical overlays. These customizations and modifications can be done in a way that they are either valid for all product editions or for one fix level only.

This is a work which has to be done under participation of the experience of the system programmers which were performing the customization and nationalization procedures according to prior art. The great advantage of the software maintenance method described herein is that much of the work which is necessary for customizing any application program can be done once and the results of it can be stored in a local-level repository 20 as described above in order to be accessible for a large plurality of end-users. Thus, the customization work is simplified and reduced.

When a software product is provided now centralized in a repository like described further above the system administrator/programmer reads the product documentation and checks whether any customization is needed for the end-user or the group of end-users he is occupied with. In case it is needed, he decides whether said customization can be done in the same way for multiple end-user systems or if customization needs to be done for one or more systems separately and selectively.

According to that decision he selects which hierarchical overlay level in the repository hierarchy should be entered for beginning an inventional 'pull-process' which selects the adequate data from the repository for a download to the end-user system(s).

In a mainframe adapted implementation of the tool as e.g., for the VM operating system, up to 255 parallel environments for one product on one system can be supported. That means that multiple parallel input hierarchies with different hierarchical overlays can be processed. Each parallel environment is processed completely separately.

In particular, the installation on Target Systems can be performed exemplarily as follows:

A STORE command is issued to a system or to a group of systems. Said command goes through the repository hierarchy—from local to top—level or reversed, local data overwrites central data—and creates a list of files. That list comprises per file the location in the repository where it could be taken from during the later download.

A list process runs as well against the target object, i.e., file system, on the target system. In case target objects like directories or files do not exist they can be created automatically via exits.

Both lists are compared and it is decided which files will be needed to be downloaded. The list processing determines as well whether files of the product are already on the target object but belong to another product there, or whether product files exist already which are not assigned to any product. The latter ones can be 'adopted' to the product.

When merging those lists data placed on hierarchy levels closer to a target system overwrites data that resides on more far away levels. The tool implementing the inventional maintenance method in a design for mainframe VM architecture advantageously searches from the top level down or the most local shadow or central repository level to the most local level repository. In other architectures this sequence, however, may be different.

The next step is the assignment of inactive names to the files. These are names that the files will have after they were downloaded, or if they are kept in an inactive format for later activation in case of a so-called backout request described further below, or in case of a product inactivation process.

Then, according to a preferred embodiment of the inventional software maintenance method the delta data is downloaded from the repository hierarchy onto the target object and is placed there with inactive, hidden names. Additionally, the store process can be interrupted, and changes in the input hierarchy can be done. A later store request will detect changes effectuated in-between and will continue to move data without copying again data that was already moved.

In case of network interrupts advantageously a retry loop is started. After a successful store a protocol file is written onto the target object. This contains for each file 'file information' like time, date, size, its active name and all inactive names it has or it will get after the completed storage, after a product inactivation, or when replaced by a new file edition, and the location from where it has been copied from.

The requester of the STORE command is informed about the progress and the results of the activities. Only the preparation and the store activities need access to the repository hierarchy. They run before the planned cutover and they don't influence the users, except that they contribute to the network load.

Then the activation or cutover into production is the next logical step. The files that have been previously stored with inactive names are renamed to the active names. Files that already exist and that will be replaced by a new edition will be renamed to the inactive 'backout' name before that. The same happens to erased files.

Said activation has many operating system specific aspects. In the exemplary VM implementation some files are updated that make the product known and available to the users. Product parts that are available via shared storage are loaded into that storage. Other operating systems need different additional activities for having the activation completed.

The inventional concepts comprise to provide some recovery processes as BACKOUT that turn back already performed activation steps in case one step fails, or, when the end-user is not content with the new products for example in case of production errors:

If the product breaks in production the previous accepted—see further below for explanation—production edition can be re-established via a BACKOUT request. Files that have been replaced by new editions and files that have been erased are renamed again to their active names, while the new ones are renamed to inactive names. Operating system specific activities may be needed as well, a sample is the update of shared storage.

According to a further inventional aspect—if a product runs well to everyone's satisfaction it should be accepted. That means all inactive data kept 'ready-to-run' for backout reasons is erased. The accept level defines what will be available again in case of a backout request after some other store/activate activities are performed again. So, ACCEPT is often the first step before a product is going to be refreshed on a system.

A further INACTIVATE is rather a rare activity. Normally, a product resides on a target object and stays there while it is updated and maintained. New parts replace old ones via the store, activate, accept activities described above. Only if it is planned to remove a product completely from a system it should be inactivated. That means the product is removed from user access but it is still available in an inactive fashion. If it turns out that it is still needed it can be activated fast again via an activate request. So, INACTIVATE helps in phasing out products securely. It has as well many operating system specific functions.

Remove:

This means the real removal of the files of a product from a system.

The inventional method enables for multiple products on one target object via the features of providing inactive names for product storing, activating, doing backouts and product inactivation. Other methods like doing a flip flop, i.e., a switching between active and inactive directories are possible as well and can be integrated into the inventional method.

It should be noted that according to a preferred aspect of the present invention only the STORE command by which files are downloaded from the network need some connectivity. All other commands do not need a network connection. In general all features described above can be preferably be performed by a single command provided from the client.

With the features described above software maintenance of even very complex software systems comprising a number of single programs fit-together in order to form one total package for achieving particular business goals becomes easier to perform with decreased business risks and network traffic.

It should be noted that many of the above inventional features can be applied independently from each other and provide specific advantages compared to prior art. In combination, however, their advantages are accumulated in most cases.

BRIEF DESCRIPTION OF THE DRAWINGS

The present invention is illustrated by way of example and is not limited by the shape of the figures of the accompanying drawings in which:

FIG. 4 is a schematic representation according to FIG. 3 representing the local-level warehouse, FIGS. 5A, B and 5C show a block diagram with the essential steps which are performed using the inventional software maintenance method and system during an upgrade process of a product X offered by a software vendor.

DESCRIPTION OF THE PREFERRED EMBODIMENTS

Figure 1B:
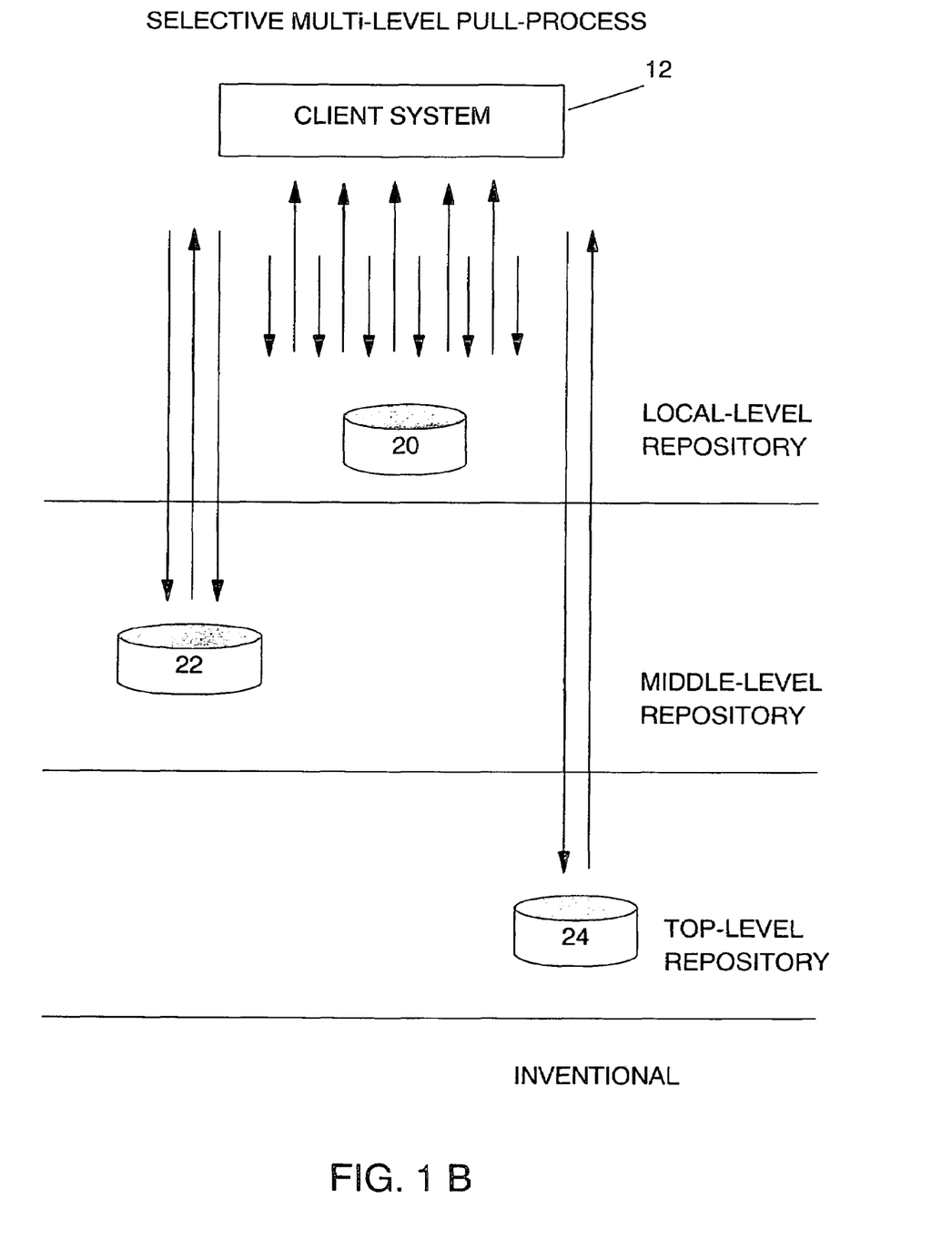

In FIG. 1B a summarizing overview reflecting some fundamental aspects of a first preferred embodiment of the inventional method and system is given describing what happens in the same situation as mentioned above while discussing prior art.

The client system 12 is provided with a set of three inventory lists each list reflecting the files present on each of the repositories of the repository hierarchy.

The inventional tool started from the client system first accesses a geographically and logically associated local-level repository 20 belonging to a software vendor. A compare between the respective inventory list and the list of files already present in the client system from older version of the product X yields the selection of files to be downloaded. Often, from the local-level repository the most files belonging to the new version are downloaded. In these downloaded files most of the customization and client-specific modifications are already included. Then the client system accesses the middle-level repository 22, where the selection is repeated and for example some country-specific files relevant for the product X can be downloaded.

Finally, the top-level repository 24 is accessed and the rest of file information is downloaded to the client system in a similar manner.

Supposing now that the local-level repository is located geographically not far from the client system the network traffic can be reduced according to the present invention as the majority of network traffic happens locally between the local-level repository 20 and the client system 12. Only a few network traffic is necessary for transferring the files from the middle-level repository 22 and the top-level repository 24, respectively.

Details of said processing are described later with respect to FIGS. 5A, 5b and 5C which illustrate a similar method with a modified control flow, however, in order to demonstrate the large scope of the present invention.

Figure 2:
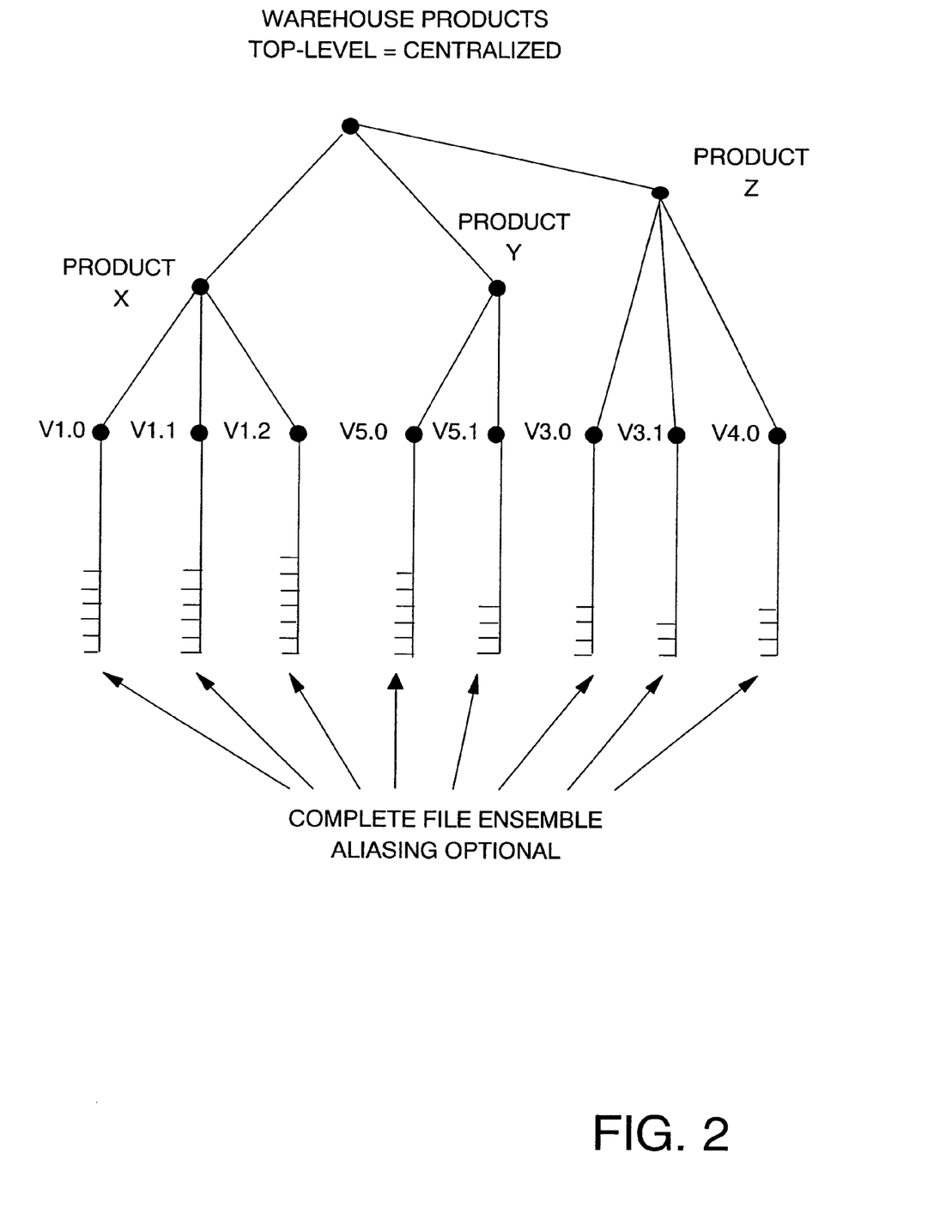
FIG. 2 is a schematic representation of the file system structure in the software vendor's warehouses represented by the repositories depicted in FIG. 1B (top-level)

In FIG. 2 an exemplary file system structure representing the warehouse of the software vendor and the software products to be offered therein is depicted for the top-level, i.e. centralized repository. Here, a subset of products X, Y and Z are depicted. For a product X the program versions 1.0, 1.1 and 1.2 are offered. For a product Y versions 5.0, 5.1 and for a product Z versions 3.0, 3.1 and 4.0 are offered. The files are stored in a file system structure logically separated so that deliverable files are stored in a directory which reflects the version number. When a file was not updated from one version to the other version it needs to be stored only once in the depicted file system tree. As it is intended by the exemplary software vendor that in each version-specific directory a complete file ensemble can be downloaded, advantageously some logical links can be made to the location of the physical existent file instead of storing identical files on multiple locations in the file system. This 'aliasing' feature is already known in prior art.

Figure 3:
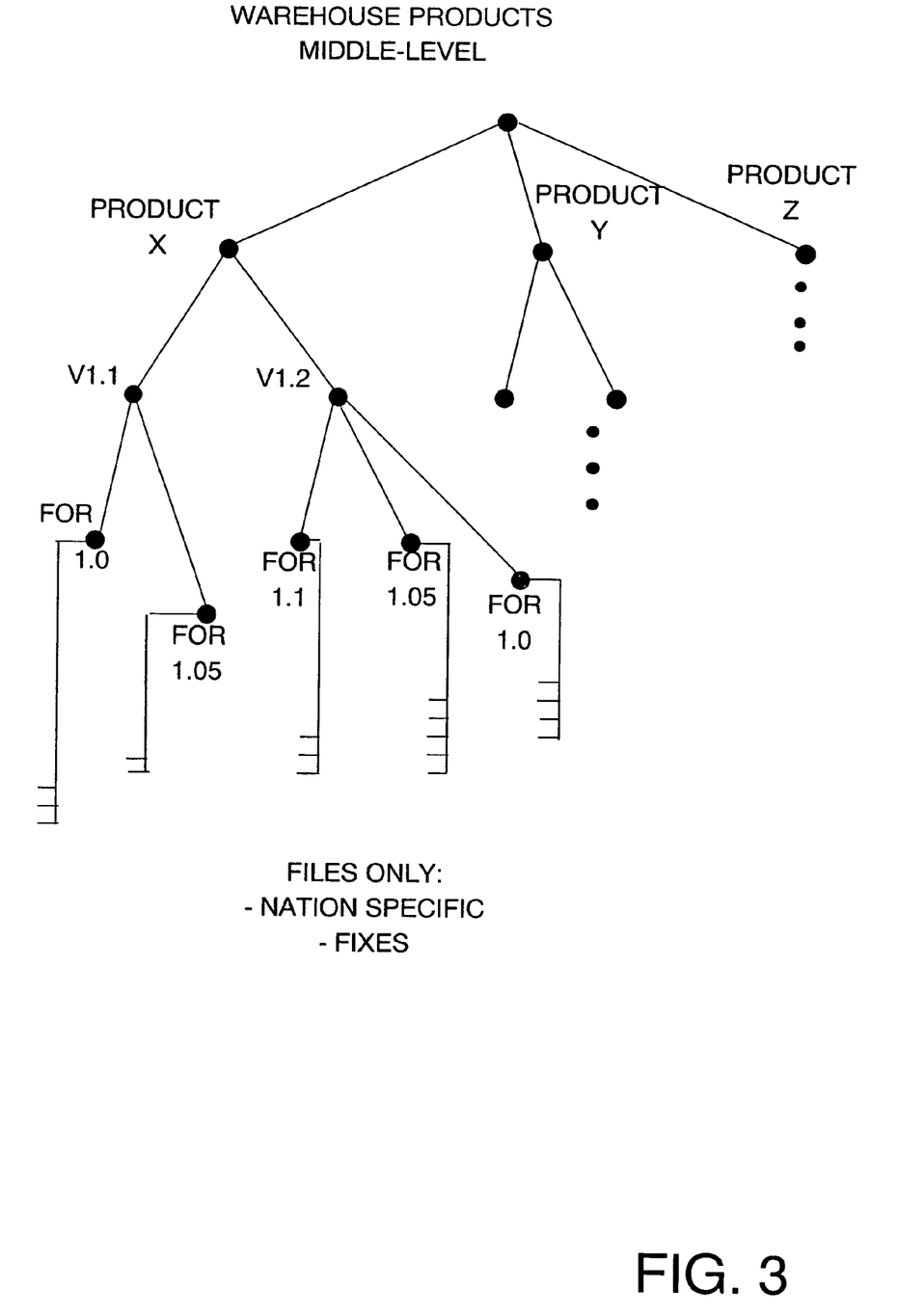
FIG. 3 is a schematic representation according to FIG. 2 representing a middle-level warehouse.

In FIG. 3 a similar representation is given for the middle-level repository also representing the products offered in the warehouse of the same software vendor.

According to the basic concepts of the present invention in such a middle-level software repository for example country-specific information can be offered to the clients in form of program configuration files which are specific relative to country-language, country-name, country-dial-code or further country-specific information, as well as country-level fixes.

Advantageously for each of the offered program versions—for example for product X the versions 1.1. and 1.2 are offered—a specific directory can be accessed which holds the files necessary to be copied for upgrading to the respective version when a particular older version is already present on the target system. For example, in order to upgrade to version 1.1 two directories are accessible, i.e. one which has to be accessed when a client system wants to upgrade from version 1.0 to version 1.1, and a different directory which can be accessed when the client wants to upgrade from a version 1.05 to version 1.1. Corresponding information is given in FIG. 3 for version 1.2 offered in the warehouse.

For product Y and product Z corresponding directories are provided which, however, are not depicted in the drawing for reasons of an improved clarity of the drawing.

Figure 4:
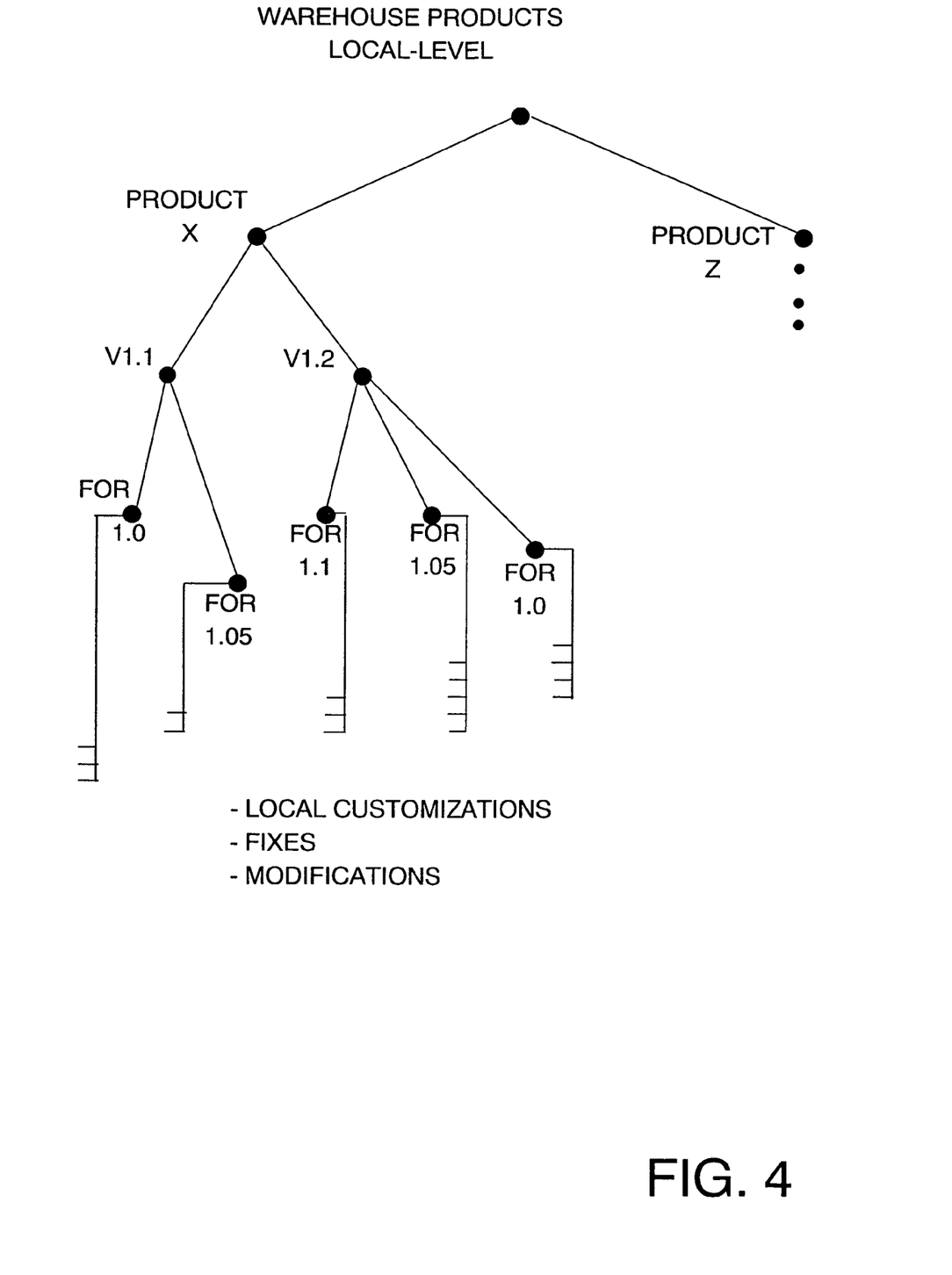

In FIG. 4 a similar representation is given for the local-level repository in which the software vendor's warehouse file system is depicted schematically. The file system structure is identical to that one depicted in FIG. 3 except that product Y is not present as for product Y there are no files present in this level. In the directories depicted for products X and Z, however, files are stored which contain advantageously local customizations which are applicable for the client system in question or, for a plurality of client systems which can be subsumed under a common client system group. Further, group-specific modifications and fixes are stored as files in the corresponding directories. Advantageously, but dependent of the respective case, in the local-level repository the stored files comprise already user customization information, user-specific modifications like user-exits which are particular to a certain subset of end-users. This information stored in these files is delta information in respect to the collection of files stored in the centralized repository.

In other words, all the individually required work which was already done by a system programmer in context with any earlier customization and modification can be re-used again without a greater effort of programming.

Further, in this way a system administrator can perform an upgrade process which is addressed to a corresponding plurality of end-users.

For product Y and product Z similar files are offered but are not depicted for improved clarity of the drawing, as well.

It is obvious that the filling of the sub-level and local-level repositories is described in relation to specific requirements given by a particular situation which was chosen arbitrarily. Thus, a plurality of different ways to fill the hierarchy with files can be expected depending on the actual business situation and system environment.

Figure 5A:
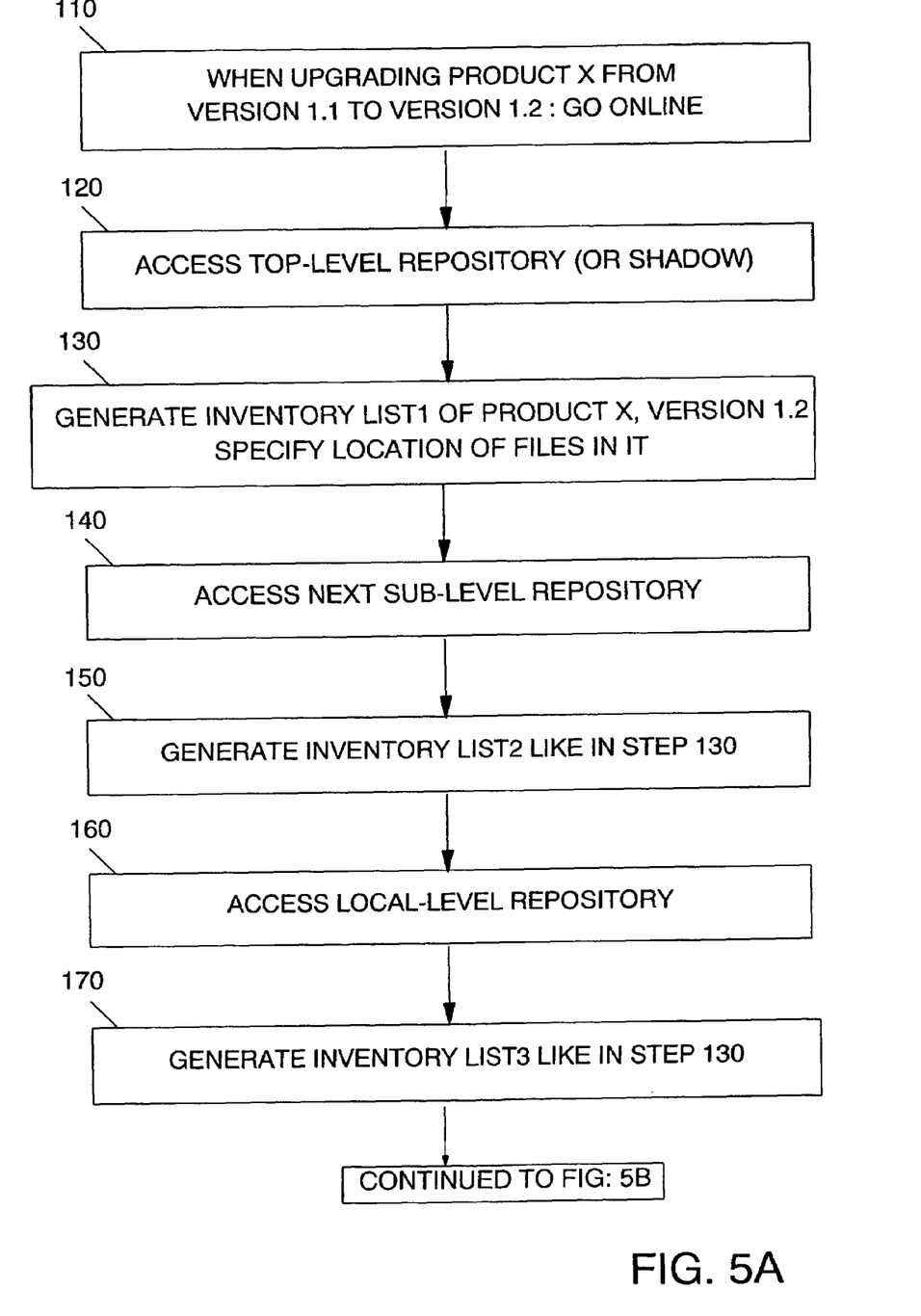

With reference now to FIG. 5A a typical upgrading process will be described according to the inventional method and disclosing the basic inventional aspects, as well as advantageous, optional aspects applied in mainframe VM operating system environment. Other environments like UNIX, or WINDOWS are possible, as well. The preparing procedure described above for filling the repositories is assumed to be completed, before.

In a first step 110 the user of a product X decides to try an upgrade from version 1.1 which is existent on the user's hardware platform to version 1.2. In the exemplarily described embodiment of the present invention said end-user asks a system operator occupied with software maintenance to perform the desired upgrade process. Thus, the he uses the software maintenance method according to the present invention in order to perform the intended upgrade process via a download process in the network with which the end-user's computer system is connectable with. Thus, the system operator first goes on-line.

In a next step 120 the system operator uses a command, called MOUNT in order to go through the repository hierarchy and 'mount' any required hard disk in the respective level, step 120, 140, 160.

On each level—beginning with the top-level, step 130, followed by the sub-level, step 150 and by the local-level-step 170—an inventory list is created—inventory lists 1,2,3 for the desired upgrade procedure which lists each list of file-related data, for each file indicating at least the location from where it could be copied and other file information like inactive name, etc. Which is described later in more detail.

Then, in a step 180 all three lists are merged. When the same file name exists a local-file overwrites a file from a higher range of the hierarchy pyramid.

Prior art exclude lists can be applied, step 190, when some particular centralizedly offered files are not intended to be installed in a client system as e.g., Italian language support for a system which is sold in the United Kingdom. Thus, they are cut away from the merged total input list.

Then, in a step 200, an inventory list of the target system is generated, or used if already present somewhere, e.g., on the client system itself, or elsewhere in order to determine which files need not to be downloaded in order to have a complete set of files needed for a ready-to-run version of the upgraded program.

Then, in a step 210 the target list is compared with the total input list and the existing files on the client system are subtracted, i.e., removed from the input list in order to generate a download list.

Then, file names are created for all files resting in the input list which indicate a name specification usable to indicate that the files first can remain inactive after a completed download onto the client system, step 215.

Then, the download is performed according to the source location specifications comprised for each file contained in the list, step 220. Thus, a plurality of files is expected to be downloaded from the most local repository 20, and a second plurality from the sub-level or middle level repository 22, whereas only a relatively small fraction of files has to be copied from the centralized top-level repository, or shadow repository, respectively, as depicted in FIG. 1B.

This saves network traffic compared to downloading a complete file ensemble the new version is comprised of in total.

After the download the online connection can be terminated and further maintenance can be performed offline.

According to further, advantageous aspects, the software maintenance method disclosed herein includes the possibility to install a new program version on a client computer system without deleting an older version already existing on the system. Further improving this approach it is possible according to the inventional method and system to go off line after having downloaded the new program versions files and to install the new version separated from the existing version in order to enable the user to run the new version for testing it and—if the user is not content with the new version—to recover the old version without larger efforts with respect to copy of file names, restoring the system environment of the old version, recovering possibly modified data input and output, etc. This advantageous aspect is performed in the exemplary embodiment described herein with some commands referred to as ACTIVATE, BACK-OUT and ACKNOWLEDGE.

Figure 5B:
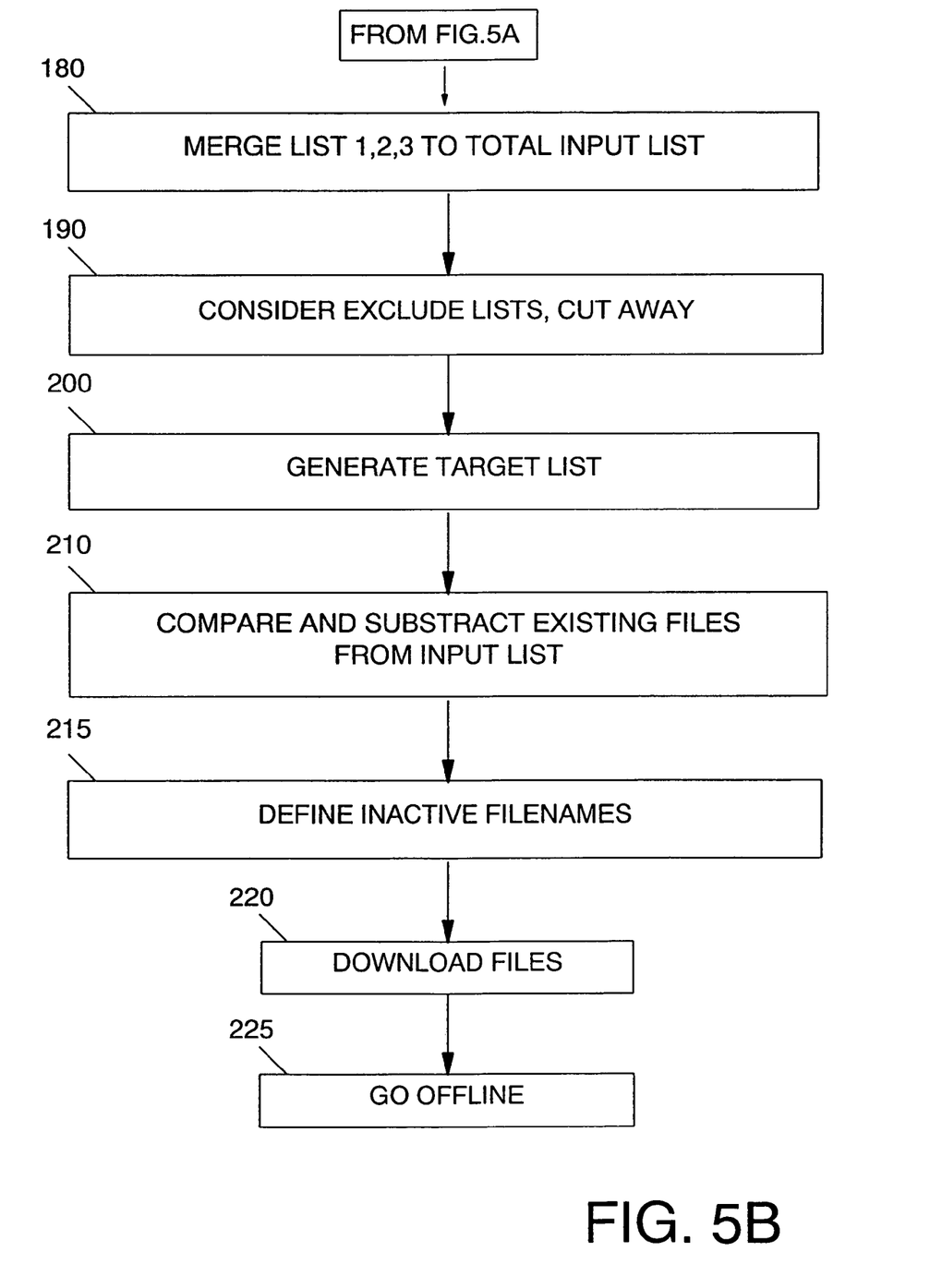
Figure 5C:
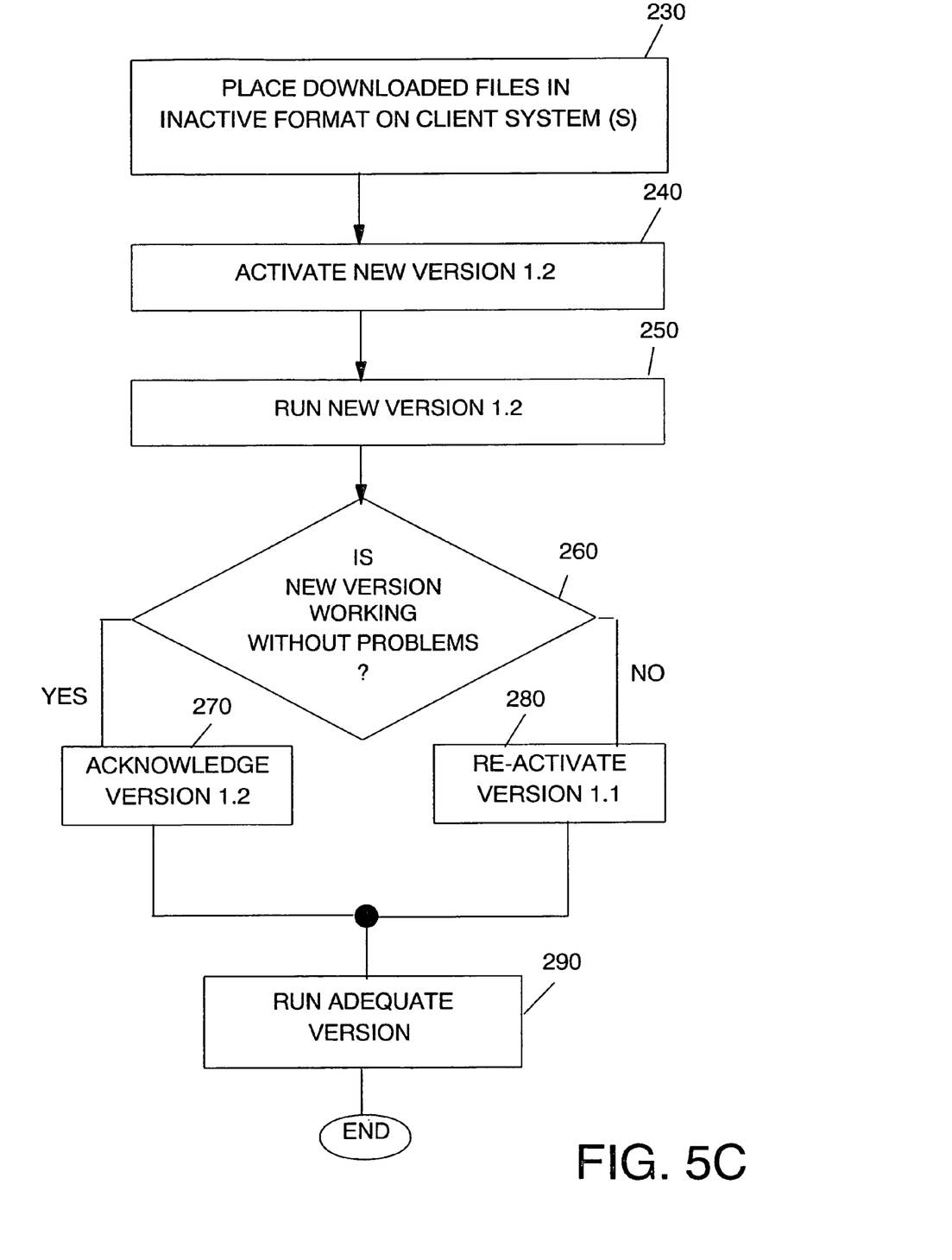

With reference now to FIG. 5C in a step 230 all downloaded files are now placed in an inactive format on the client system associated to the end-user. The status of the files of being inactive can be made public for the operating system by referencing the above mentioned file attributes, in this case a status field which is filled with an 'inactive flag', or, as described above, with a file name which is able to identify said inactive status. The, the end-user decides to test the new program version.

During the download of step 220 some network traffic is generated between the local-level repository 20 and the client system 12, as it is depicted in FIG. 1B. When a software provider, or a software vendor which supplies a large geographic region like a continent or a plurality of continents with some number of software products he can advantageously establish on each continent a kind of central, or top-level repository with a plurality of middle-level repositories each associated with the top-level repository in order to store the programs offered by him in an improved way compared to storing them only in a centralized manner. In further improvement of said aspect the repository hierarchy can be extended in order to comprise a plurality of third-level repositories each connectable with one or more associated middle-level repository and an associated top-level repository. Further, some shadow repositories can be provided which comprise the full complete amount of files, i.e. the complete file ensemble of each of the versions offered by the software vendor as already indicated above.

With reference now to FIG. 5C in a step 230 all downloaded files are now placed in an inactive format on the client system associated to the end-user. The status of the files of being inactive can be made public for the operating system by referencing the above mentioned file attributes, in this cave a status field which is filled with an 'inactive flag', or, as described above, with a file name which is able to identify said inactive status. Then, the end-user decides to test the new program version.

Thus, in a step 240 he activates the new version 1.2. As reveals from the above described procedure the step of activating the new version is independent of the download procedure. This is an advantageous effect because it saves money due to reduced online time and because it decouples both processes. So, any download interruption has no influence on the existing file system architecture of the running and operative old version of the application program to be upgraded.

In particular, the activation of the new version means that the old version is inactivated. In particular, this is achieved by renaming the new files from inactive names to active names and renaming the former active files to 'backout' file names before. The status field of each file is changed correspondingly.

Then, the end-user who desired the new program version can run the new version and can test if it satisfies his expectations. In order to do that the end-user runs the new version program with a plurality of input and configuration data and checks for a proper operation, step 250, step 260. Then he decides if the new version is working satisfyingly or not. If there are no serious problems—see the yes branch of decision 260—the user decides to primarily work with the new program version. Thus, he or the system administrator uses a certain command comprised of the basic concepts of the present invention, i.e. the ACKNOWLEDGE command which acknowledges to the operating system that the new version is the standard program version to be used in future.

In should be noted that the step 270 of acknowledging a new version is not at all required for a regular and repetitive, 'daily' operation of the new program version. Instead, it will often be performed just before a next version—for example version 1.3—of the same product will be installed according to the same method of software maintenance as described herein.

If the new program version causes serious problems, the NO-branch of decision 260—the user does not wish to continue the work with the new program version. Instead, he is able to decide to reactivate the former version 1.1, step 280. This is done by a single REACTIVATE command signaled to the operating system as described above. In this case the attributes are updated correspondingly as described above, the old system environment and input and output files can be used in order to guarantee a proper working of the old version 1.1.

Thus, anyhow, the end-user is able to run an adequate and satisfying version of his program, step 290.

It should be understood that the inventional concept is open in order to integrate one or more additional hierarchy levels, or, to omit one so as to work with only two different levels.

Furthermore, the above mentioned shadow repositories can be established so as to economize network traffic because a plurality of shadow repositories shadowing and replicating the data per se present in the single and central repository contribute to shorter-distance network connections during the required download processes.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, the sequence in which the repositories depicted in FIG. 1 and described with reference to FIGS. 5A, 5B and 5C are accessed can be varied from top to down or from down to top. It must be made sure, however, that the more customized and more local files overwrite files which were copied from a more central repository in case of being redundantly stored in a plurality of repositories.

According to a further preferred aspect of the present invention a so-called look-aside process can be integrated into the above described upgrade procedure. In case somewhere close to the target client system is a second target system having already installed a plurality of files which are required to be downloaded the procedure can look 'aside' to said second system and copy said files from there using a LAN instead of a long distance remote connection for download. This can happen in a case when said second 'neighbor' system is already equipped with the files of any higher version than installed on the target system—but the new version is not yet switched productive on said second system.

Further, the way in which the files belonging to a respective version are identified to the operating system of the client computer system can be varied. A reliable prior art method for doing this is modification of file names as described above, but depending of the facilities of the associated operation system variation of file attributes with a corresponding operation system control can do the same.

The inventional software maintenance method and system is open to be applied for installing a plurality of products, i.e. product X, product Y and product Z to the same target system. This is achieved by maintaining an inventory list for each product or product part on the client system. Said inventories form a reference to the active and inactive data associated to each product.

Further, according to the present invention no packaging files are required which describe which data or which files belong to which product versions. Said association can be achieved by the directory structure and the data stored therein, respectively.

Further, a tool-internal 'UNDO' feature can easily be integrated into the inventional method which works separately from the BACKOUT process described further above. Via this feature the previous version can be fetched back into activity. Said previous version need not necessarily be the last ACCEPTED version. It should be noted that said UNDO works stand-alone, i.e., offline from the network.

Further, the inventional method and the program tool implementing said method can be extended to integrate dedicated exit points which are freely programmable with a special purpose dedicated code and represent particular interfaces in order to fulfill different tasks like change-problem management, reporting licence management, etc. Said exits can be invoked advantageously before and after a particular request or run of the tool, respectively, before and after a target system was completed to be analyzed by said tool. Said exits may be dedicated for all products in question, or for a particular subset of them—dependent of the products and the systems in question. Exits can also be advantageously be used in order to place customization data, i.e., files or data like e.g., an IP address into a repository, and preferably into the local repository.

The present invention can be realized in hardware, software, or a combination of hardware and software. A software maintenance tool according to the present invention can be realized and stored on a data carrier and be run from a client system, for example. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

The invention claimed is:

1. A method for maintaining software products implemented in a plurality of files in client computer systems located decentralized relative to at least one central software maintenance institution wherein the client computer systems are connectable with the at least one central software maintenance institution via a network, the method comprising the steps of:

providing product information for a product in the network system for making the product information available for said plurality of client systems; and performing a software maintenance action for the product from a client site by downloading data required for said software maintenance action from a sequence of repositories, wherein said sequence of repositories includes at least a top-level repository storing a set of files for the product and a local-level repository storing a first subset of files for the product, wherein the first subset of files is specific for a given client system, and data downloaded from the top-level repository is different from data downloaded from the local-level repository and the data downloaded from both the top-level repository and the local-level repository is used by the given client system in performing the software maintenance action.

2. The method according to claim 1 wherein the sequence of repositories includes a mid-level repository storing a second subset of files for the product, wherein the second subset of files includes at least one of a version update, a fix, and nation-specific files.

3. The method according to claim 2 in which a fall back to an older program version is achieved by inactivating a newer version and activating the older version.

4. The method according to claim 1 further comprising the step of integrating files into the target system which have been identified by a look-aside procedure as residing in a neighbor system easier to be accessed by the target system than one of said repositories.

5. A method for maintaining software products implemented in a plurality of files in client computer systems located decentralized relative to at least one central software maintenance institution wherein the client computer systems are connectable with the at least one central software maintenance institution via a network, the method composing the steps of;
   providing product information for a product in the network system for making the product information available for said plurality of client systems;
   performing a software maintenance action for the product from a client site by downloading data required for said software maintenance action from a sequence of repositories, wherein said sequence of repositories includes at least a top-level repository storing a set of files for the product and a local-level repository storing a first subset of files for the product, wherein the first subset of files is specific for a given client system, wherein the performing step comprises;
      generating an input list of files downloadable from said sequence of repositories;
      generating a list of files present on said target client system;
      comparing the list of files downloadable from said sequence of repositories with the list of files present on said target client system; and
      downloading a plurality of files, wherein the plurality of files includes only files which are not yet present in the target client system.

6. The method according to claim 5 in which a total input list is generated by subsequently accessing the repositories and by merging input lists for each repository with a priority of more local files.

7. A system for maintaining software products, the system comprising:
   at least one central software maintenance site;
   a network;
   a plurality of client computer systems decentralized relative to the at least one central software maintenance site, wherein the client computer systems are connectable with the at least one central software maintenance institution via the network; and
   a sequence of repositories, wherein the sequence of repositories provides product information for a product in the network system for making the product information available for said plurality of client systems, wherein said sequence of repositories includes at least a top-level repository storing a complete set of files for the product and a local-level repository storing a first subset of files for the product, wherein the subset of files is specific for a given client system,
   wherein a given client computer system from within the plurality of client computer systems performs a software maintenance action for the product by downloading data required for said software maintenance action from the sequence of repositories and data downloaded from the top-level repository is different from data downloaded from the local-level repository and the data downloaded from both the top-level repository and the local-level repository is used by the given client system in performing the software maintenance action.

8. The system according to claim 7, wherein the sequence of repositories is provided as a plurality of hierarchically arranged repositories.

9. The system according to claim 8, further comprising:
   at least one neighbor system, wherein the software maintenance action includes integrating files into the target system which have been identified by a look-aside procedure as residing in the at least one neighbor system easier to be accessed by the target system than one of said repositories.

10. The system according to claim 7, wherein the sequence of repositories includes a mid-level repository storing a second subset of files for the product, wherein the second subset of files includes at least one of a version update, a fix, and nation-specific files.

11. The system according to claim 7, further comprising shadow repositories for at least a subset of the sequence of repositories.

12. A computer program product, in a computer readable medium, for maintaining software products implemented in a plurality of files in client computer systems located decentralized relative to at least one central software maintenance institution wherein the client computer systems are connectable with the at least one central software maintenance institution via a network, the computer program product comprising:
   instructions for providing product information for a product in the network system for making the product information available for said plurality of client systems; and
   instructions for performing a software maintenance action for the product from a client site by downloading data required for said software maintenance action from a sequence of repositories, wherein said sequence of repositories includes at least a top-level repository storing a complete set of files for the product and a local-level repository storing a first subset of files for the product, wherein the first subset of files is specific for a given client system, and data downloaded from the top-level repository is different from data downloaded from the local-level repository and the data downloaded from both the top-level repository and the local-level repository is used by the given client system in performing the software maintenance action.

13. The computer program product according to claim 12, wherein the sequence of repositories includes a mid-level repository storing a second subset of files for the product, wherein the second subset of files includes at least one of a version update, a fix, and nation-specific files.

14. The computer program product according to claim 13 in which the instructions for performing said maintenance action serves for an upgrade of a program on at least one target system and the instructions for performing said maintenance action includes:
- instructions for generating an input list of files downloadable from said sequence of repositories;
- instructions for generating a list of files present on said target client system;
- instructions for comparing the list of files downloadable from said sequence of repositories with the list of files present on said target client system; and
- instructions for downloading a plurality of files, wherein the plurality of files includes only files which are not yet present in the target client system.

15. The computer program product according to claim 14 in which a total input list is generated by subsequently accessing the repositories and by merging input lists for each repository with a priority of more local files.

16. The computer program product according to claim 12, further comprising instructions for integrating files into the target system which have been identified by a look-aside procedure as residing in a neighbor system easier to be accessed by the target system than one of said repositories.

* * * * *

UNITED STATES PATENT AND TRADEMARK OFFICE
CERTIFICATE OF CORRECTION

PATENT NO. : 7,036,121 B1
APPLICATION NO. : 09/696399
DATED : April 25, 2006
INVENTOR(S) : Casabona et al.

It is certified that error appears in the above-identified patent and that said Letters Patent is hereby corrected as shown below:

Col. 10, lines 3-11:

delete:
"With reference now to FIG. 5C in a step 230 all downloaded files are now placed in an inactive format on the client system associated to the end-user. The status of the files of being inactive can be made public for the operating system by referencing the above mentioned file attributes, in this case a status field which is filled with an "inactive flag", or, as described above, with a file name which is able to identify said inactive status. The, the end-user decides to test the new program version."

and insert:
--In order to achieve these advantageous aspects all files which have to be downloaded must be associated with some attributes. These attributes comprise: the path and file name of the file to be downloaded, the file name which is used in order to address it when the program version to which the file belongs is activated, some further operation system-specific data, some file names, used to identify the concerned file in a BACKOUT process, in an INACTIVATE process, to identify the file in the warehouse of the local-level repository 20, and some status information reflecting an intended action and completed actions which were done with the respective file.--

Col. 10, line 36: after "this" delete "cave" and insert --case--.

Col. 13, line 33: after "method" delete "composing" and insert --comprising--.

Signed and Sealed this

Twenty-first Day of November, 2006

JON W. DUDAS
*Director of the United States Patent and Trademark Office*